April 20, 1943.  A. T. BALL, JR  2,317,168
THERMOCOUPLE
Filed Feb. 6, 1941
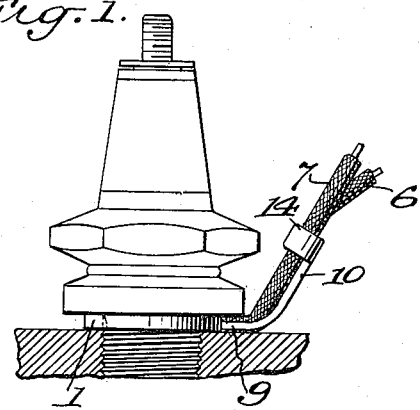
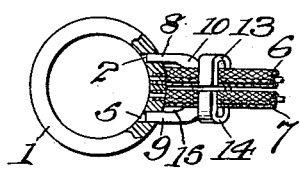
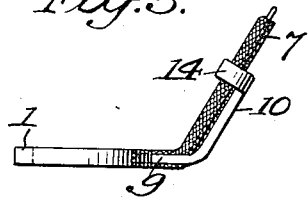
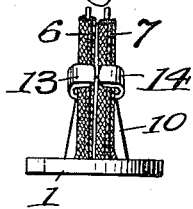
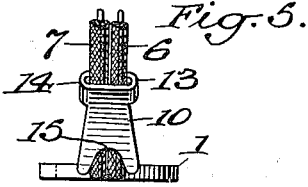
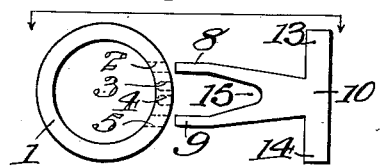
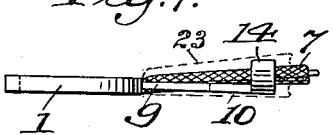
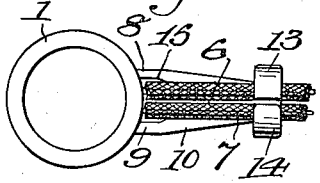
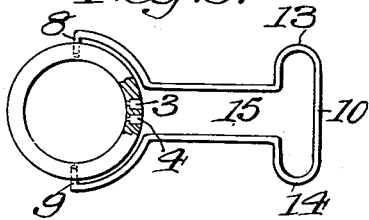
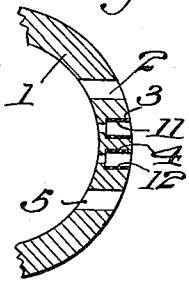
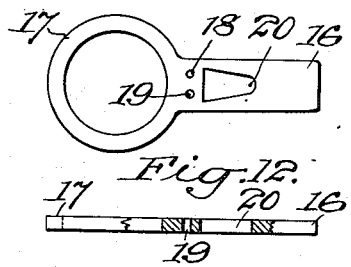
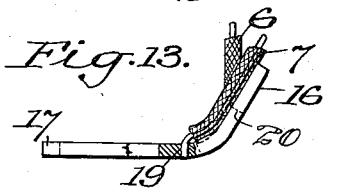
INVENTOR.
Arthur T. Ball, Jr.
BY
Brown & Seward
Attorneys Patented Apr. 20, 1943

2,317,168

UNITED STATES PATENT OFFICE 2,317,168

THERMOCOUPLE

Arthur Thomas Ball, Jr., Tariffville, Conn.

Application February 6, 1941, Serial No. 377,643

5 Claims. (Cl. 136—4)

This invention concerns thermocouples and methods of assembling the same for use in engines or other apparatus in which it is desired to supervise temperature.

Thermocouples presently in use are not entirely satisfactory in that the wires break off adjacent their points of contact with the temperature responsive body due to constant bending or other strain at these points. Also, satisfactory insulation from outside conditions having an undesirable effect on the accuracy of the couple has not been provided. Further, the means by which the wires have been attached and their location with respect to the source of temperature to be considered has been such as to permit considerable inaccuracies in the final result.

The object of my invention is to provide a thermocouple of novel construction in which a support is provided for maintaining the conducting means in fixed position at their points of contact with a temperature responsive body irrespective of the bend imparted to the support.

Another object is to provide a thermocouple of a very high degree of accuracy.

Another object is to provide a thermocouple adapted for long usage without having its efficiency impaired by usual wear.

Another object is to provide a thermocouple which may be calibrated at high temperatures and is highly resistant to oils, greases, and acids.

A further object is to provide a thermocouple of such construction that the above and other objects may effectively be attained.

My invention comprises, generally, a thermocouple including in combination a temperature responsive body, conducting means in contact therewith, and a support for said conducting means.

More specifically, my invention comprises a temperature responsive ring, conducting means affixed therein, a support for said means affixed thereto, said support holding the conducting means in position at the body, and means for insulating portions of the conducting means.

Practical embodiments of my invention are represented in the accompanying drawing, in which Fig. 1 represents a side elevation of an embodiment of my invention as applied under a spark plug.

Fig. 2 represents a plan view of the form shown in Fig. 1;

Fig. 3 represents a side elevation of the form shown in Fig. 1;

Fig. 4 represents a front elevation of the form shown in Fig. 1;

Fig. 5 represents a back elevation of the form shown in Fig. 1;

Fig. 6 represents a plan view of the ring and support before they are assembled;

Fig. 7 represents a side elevation of a flat embodiment of my invention;

Fig. 8 represents a top plan view of the embodiment shown in Fig. 7;

Fig. 9 represents a plan view of a modified form of the support of the embodiment shown in Fig. 1;

Fig. 10 represents an enlarged detail, in section, of a portion of the ring showing the adaptation for the mounting of the support and the contact ends of the conducting means;

Fig. 11 represents a top plan view of a modified form of my invention, the support for the conducting means being formed integral with the ring;

Fig. 12 represents a side elevation, partly in section of the form shown in Fig. 11;

Fig. 13 represents a side elevation, partly broken away, showing the conducting wires mounted on the form shown in Fig. 11 which has been bent to a desired position; and Fig. 14 represents a vertical section of an embodiment of my invention in which the ring is provided with exterior insulation, said insulation forming a support for the conducting means.

With reference to the embodiment shown in Figs. 1 to 10 inclusive of the drawing, a temperature responsive body such as a ring or washer, preferably of copper or other suitable material, is denoted by 1. This ring is of a suitable thickness to be grooved, drilled, or otherwise perforated at 2, 3, 4, 5 to receive the contact ends of calibrated wires 6, 7 and the prongs 8, 9 of a support 10. Said wire ends and support prongs are suitably fastened to the ring 1 as by soldering with a suitable material, such as silver solder.

In the embodiments shown in Figs. 1 to 10 inclusive, the contact ends of wires 6, 7 are fixed close to the inner circumference of ring 1 in order to bring them as close to the source of temperature to be studied as is conveniently possible. In order to ensure accuracy, the wires 6, 7 are insulated from their contact points to and beyond the outer circumference of ring 1, the insulation provided in the ring itself being shown in Fig. 2 and denoted by 11, 12 in Fig. 10.

A bendable support 10 has ears 13, 14 which are bent around wires 6, 7, thereby securing them to said support. Prongs 8, 9 straddle a cut-out portion 15 which accommodates portions of wires 6, 7 as the support is bent upwardly and also facilitates bending of the support 10. This cut-out minimizes heat conduction through the prongs and allows the support to be bent to the desired position without disturbing the original position of the wires 6, 7 at their point of contact with the ring 1 either at its inner or outer circumference. Also, protection of the wires from fracture is afforded at both sides by the support 10, as shown. The other form of support may comprise a single piece of wire of suitable material, as shown in Fig. 9, which support will function the same as that described above.

My thermocouple may be assembled as follows: the ring is perforated, the wires inserted in the perforations, the support prongs inserted, the solder applied to the inner ends of wires and prongs and the ears of the support bent to hold the wires in place. The wires may then be led in the desired direction.

In the embodiment shown in Figs. 11 to 13 inclusive, a support 16 is formed integral with the ring 17, and is provided with holes 18, 19 for the contact ends of wires 6, 7. A cut-out portion 20 is provided for reasons set forth above. Fig. 13 shows the application of the wires 6, 7 to this embodiment after bending the support.

In the embodiment shown in Fig. 14, the ring 21 is furnished with an exterior insulation 22 affixed around its outer circumference. The ring 21 and insulation 22 are bored to receive the contact ends of wires 6, 7 which may be affixed proximate the inner circumference of ring 21 in any well known or approved manner. A portion of the insulation 22 acts as a support for the wires 6, 7, thereby maintaining them in their original position with respect to ring 21.

This form may be assembled by boring the ring at suitable intervals, boring the insulation, applying it to the ring exteriorly, inserting the wires and affixing them to the ring.

Any embodiment of my invention may be protected by insulation 23 (shown in dotted lines on Fig. 7) around supports 10 and 16 and wires 6 and 7 to insulate them from exterior changes in temperature, such as high velocity air of various temperatures, thereby keeping the generated heat inside the insulation.

It will be understood that the rings 1, 17 and 21 need not necessarily be circular but may be of any desired shape suitable for a prescribed situation. The ring should also be of a sufficient thickness so that it may be suitably grooved or drilled as desired and still allow for "facing off" to secure an accurate, flat surface.

It will also be understood that the wires 6, 7 and their support may be entirely insulated if desired, as for example where high temperatures are to be encountered during the use or calibration of the thermocouple.

It will be understood that the supports which are not formed integral with the ring or insulation may be of any suitable material, such as stainless steel which is bendable, strong and resistant to oils, greases, heat and corrosion. The resistance of this material to heat includes resistance to the flow or conduction of heat; stainless steel being characterized by low heat conductivity relative to the ring material, so that the support will have a minimum effect on the temperature of the thermocouple hot junction and will not adversely affect the electric potential to be measured.

It will also be understood that the conducting wires 6, 7 may be of iron and constantan, or other dissimilar metals which, when connected together and subjected to heat, furnish a measurable electric potential. This potential may be measured in any well known or approved manner as by a potentiometer (not shown herein) connected to the wires 6, 7.

It will be seen from the above that I have provided a thermocouple which is extremely accurate, durable and adaptable, and which may be quickly and easily assembled.

It is evident that various changes may be made in the construction, form and arrangement of the several parts and therefore I do not intend to be limited to the particular embodiments shown and described herein.

What I claim is:

1. A thermocouple comprising a temperature responsive ring having holes extending directly through the ring from its outer to its inner circumference, thermocouple wires having their contact ends fixed in two of said holes close to the inner circumference of the ring, insulation for the wires extending from said contact ends to and beyond the outer circumference of the ring, and a bendable support secured to the wires and having prongs fixed within the two remaining holes in the ring upon opposite sides of the thermocouple wires, said support being bendable with the wires to different positions without disturbing the original position of the wires within the ring.

2. A thermocouple comprising a temperature responsive ring having holes extending directly through the ring from its outer to its inner circumference, thermocouple wires having their contact ends fixed in two of said holes close to the inner circumference of the ring, insulation for the wires extending outwardly from within the ring to and beyond the outer circumference thereof, and a metallic support of low heat conductivity relative to the ring material secured at its outer end to the insulated thermocouple wires and having prongs at its inner end fixed within the two remaining holes in the ring upon opposite sides of the wires.

3. A thermocouple comprising a temperature responsive ring having holes extending directly through the ring from its outer to its inner circumference, thermocouple wires having their contact ends fixed in two of said holes close to the inner circumference of the ring, insulation for the wires extending outwardly from within the ring to and beyond the outer circumference thereof, and a metallic support of low heat conductivity relative to the ring material secured at its outer end to the insulated thermocouple wires and having prongs at its inner end fixed within the two remaining holes in the ring upon opposite sides of the wires, said support being bendable with the wires to different positions without disturbing the original position of the wires within the ring.

4. A thermocouple comprising a temperature responsive ring having holes extending directly through the ring from its outer to its inner circumference, thermocouple wires having their contact ends fixed in two of said holes close to the inner circumference of the ring, insulation for the wires extending outwardly from within the ring to and beyond the outer circumference thereof, and a stainless steel support secured at its outer end to the insulated thermocouple wires and having prongs at its inner end fixed within the two remaining holes in the ring upon opposite sides of the wires.

5. A thermocouple comprising a temperature responsive ring having holes extending directly through the ring from its outer to its inner circumference, thermocouple wires having their contact ends fixed in two of said holes close to the inner circumference of the ring, insulation for the wires extending outwardly from within the ring to and beyond the outer circumference thereof, and a stainless steel support secured at its outer end to the insulated thermocouple wires and having prongs at its inner end fixed within the two remaining holes in the ring upon opposite sides of the wires, said support being bendable with the wires to different positions without disturbing the original position of the wires within the ring.

ARTHUR T. BALL, Jr.